(12) United States Patent
Turner et al.

(10) Patent No.: US 8,016,434 B2
(45) Date of Patent: Sep. 13, 2011

(54) METHOD AND SYSTEM FOR PROJECTING AN ANIMATED OBJECT AND CONCURRENTLY MOVING THE OBJECT'S PROJECTION AREA THROUGH AN ANIMATION PATTERN

(75) Inventors: Richard B. Turner, Valencia, CA (US); David F. Barnett, Simi Valley, CA (US); Thomas E. Brentnall, III, Cypress, CA (US)

(73) Assignee: Disney Enterprises, Inc., Burbank, CO (US)

( * ) Notice: Subject to any disclaimer, the term of this patent is extended or adjusted under 35 U.S.C. 154(b) by 421 days.

(21) Appl. No.: 12/133,967

(22) Filed: Jun. 5, 2008

(65) Prior Publication Data

US 2009/0303447 A1    Dec. 10, 2009

(51) Int. Cl.
*G03B 21/28* (2006.01)
*G03B 21/00* (2006.01)

(52) U.S. Cl. ............ 353/99; 353/46; 353/51

(58) Field of Classification Search .......... 353/46, 353/48, 49, 50, 51, 28, 73, 98, 99, 90; 359/196.1, 359/201.1, 201.2, 202.1; 348/195, 203, 205
See application file for complete search history.

(56) References Cited

U.S. PATENT DOCUMENTS

| | | | | |
|---|---|---|---|---|
| 4,003,080 | A * | 1/1977 | Maiman et al. | 348/196 |
| 4,956,655 | A * | 9/1990 | Wakebe | 353/101 |
| 5,365,288 | A | 11/1994 | Dewald et al. | |
| 5,402,192 | A | 3/1995 | Gelman | |
| 5,580,140 | A | 12/1996 | Katz et al. | |
| 5,649,706 | A * | 7/1997 | Treat et al. | 273/358 |
| 5,663,817 | A | 9/1997 | Frapin et al. | |
| 5,729,374 | A | 3/1998 | Tiszauer et al. | |
| 6,062,692 | A | 5/2000 | Ishigaki et al. | |
| 6,099,128 | A | 8/2000 | Jessl | |
| 6,249,091 | B1 | 6/2001 | Belliveau | |
| 6,331,756 | B1 | 12/2001 | Belliveau | |
| 6,459,217 | B1 | 10/2002 | Belliveau | |
| 6,499,846 | B1 | 12/2002 | Hiller et al. | |
| 6,570,348 | B2 | 5/2003 | Belliveau | |
| 6,605,907 | B2 | 8/2003 | Belliveau | |
| 6,664,745 | B2 | 12/2003 | Belliveau | |
| 6,765,544 | B1 | 7/2004 | Willson | |

(Continued)

FOREIGN PATENT DOCUMENTS

WO    2007145771 A2    12/2007

*Primary Examiner* — Que T Le
*Assistant Examiner* — Pascal M Bui Pho
(74) *Attorney, Agent, or Firm* — Marsh Fischmann & Breyfogle LLP; Kent A. Lembke

(57) ABSTRACT

A projection assembly and projection method for accurately reproducing animated and live characters, objects, and effects. The projection assembly uses a high precision robotic mirror system to achieve very high levels of image resolution, brightness, and contrast. The assembly includes a projector receiving an input image stream, and a mirror assembly is positioned proximate to the projector outlet. The mirror assembly uses positionable mirrors to reflect the projected images onto a display surface at positions that define an animation pattern on the display surface for the projected image or character. The assembly includes a motor controller assembly positioning the mirrors based on position data defining the animation pattern. The projected images may be provided in a projection area that is a fraction of the size of the display surface, such that the resolution and output light of the projector are concentrated on the display surface within this projection area.

4 Claims, 9 Drawing Sheets

U.S. PATENT DOCUMENTS

| | | |
|---|---|---|
| 6,832,724 B2 | 12/2004 | Yavid et al. |
| 6,843,568 B2 | 1/2005 | Schenk et al. |
| 6,854,850 B2 | 2/2005 | Yaniv |
| 6,927,545 B2 | 8/2005 | Belliveau |
| 6,930,456 B2 | 8/2005 | Belliveau |
| 7,003,172 B2 | 2/2006 | Takeuchi et al. |
| 7,086,742 B2 | 8/2006 | Hatakeyama et al. |
| 7,252,386 B2 | 8/2007 | Matsumoto |
| 7,253,942 B2 | 8/2007 | Belliveau |
| 7,264,360 B2 * | 9/2007 | Hatakeyama et al. .......... 353/99 |
| 7,284,866 B2 * | 10/2007 | Buchmann ...................... 353/42 |
| 7,377,651 B2 | 5/2008 | Belliveau |
| 2002/0093296 A1 | 7/2002 | Belliveau |
| 2003/0164461 A1 | 9/2003 | Kelly, Jr. et al. |
| 2006/0158756 A1 * | 7/2006 | Hay ............................... 359/858 |
| 2006/0250583 A1 * | 11/2006 | Huibers et al. .................. 353/30 |
| 2007/0109509 A1 * | 5/2007 | Lee ................................. 353/99 |
| 2007/0201004 A1 | 8/2007 | O'Connell et al. |

\* cited by examiner

METHOD AND SYSTEM FOR PROJECTING AN ANIMATED OBJECT AND CONCURRENTLY MOVING THE OBJECT'S PROJECTION AREA THROUGH AN ANIMATION PATTERN

BACKGROUND OF THE INVENTION

1. Field of the Invention

The present invention relates, in general, to projection and display systems and technology, and, more particularly, to projection systems adapted to display images or characters with high resolution and brightness on a display surface or screen such that the images or characters are animated or move on the surface or screen.

2. Relevant Background

In theme parks and other entertainment venues, guests and visitors are often entertained by movies and animated films. For example, queue areas may include display screens where a short animated film is shown to make a wait more enjoyable and may be used as part of the overall show or for advertising upcoming events, other attractions, and available services and products. It is desirable for these movies and animated works to be shown in high resolution or with good quality, and this is typically not a problem in environments where the lighting, the distance from the projection screen or surface is easily controlled, and other display or projection parameters may be easily controlled or changed to suit the needs of the display.

However, there are many applications where the designers of a movie or animated film display have to overcome challenging design parameters. For example, theme and amusement parks may include rides in which the guests or passengers are moved through a show area in vehicles and due to space constraints, a display or projection screen has to be placed very close to the side of the vehicle. As a result, the displayed image may only be several feet from the viewing passengers or guests, and such closeness to a projection screen can make it very difficult to provide high quality images (e.g., images with relatively high resolution and brightness). For example, a projection or display screen may be similar in size to those found in movie theaters, and use of a single projector such as one with a resolution of 1024 by 768 pixels or the like would result in the image appearing grainy and dull to viewers due to the relatively large pixel size (e.g., similar to sitting closer than the front row to watch a movie at a theater).

In other applications, it may be desirable to display animated characters or movie/film images to select groups of the riders or guests in the vehicles (such as to guests as their vehicle passes a portion of the display or projection screen/surface), and it is difficult to provide high quality imagery on only a portion of the screen or provide characters that can move with the vehicle. Another problem facing many ride designers is how to maintain a desired level of darkness or blackness on unused portions of the screen such as when the character is only located in a portion of the large screen. Typically, a single projector will project some lower level of light onto these non-projected areas causing the screen about the displayed image to be undesirably gray or illuminated.

The problem may be stated more generally as involving media playback on a large screen, and the media playback may include animated characters, such as animals, people, or other characters from an animated work or film. The use of a single projector does not provide enough pixels or a high enough resolution to create an acceptably sharp image for an audience located only a few feet away (e.g., as may be viewed through an opening, a window, or a porthole of a ride vehicle such as may be provided in an underwater ride like a submarine, a spaceship, and many other vehicles or in non-ride applications).

In an attempt to overcome the problems with using one projector for a large screen, some projection systems have been created that utilize numerous projectors that each project on a smaller subset of the display surface. Each of these projectors typically has to be arranged to overlap or feather their edges to create a continuous image. High resolution can be achieved by synchronizing all of the playback devices providing images to the projectors. In one exemplary implementation, a tiled projector system was utilized that included 90 projectors with 90 synchronized, high definition playback devices such that these projectors acted together to display a movie or a set of animation images (e.g., at a rate of 24 to 30 frames per second or the like). In other words, each projector was used to display images on a much smaller area of the screen to provide an adequate resolution or number of pixels within each smaller area (e.g., onto about 1/90 of the screen area in this example). While useful in some applications, the use of numerous projectors to display a movie typically is very expensive, and it is complex to design the physical arrangement of the projectors and the control and feed/input of the playback devices (e.g., costly and time consuming to produce the input media and to blend all of the projected images together to provide a single high resolution image). During use to display a movie or animated work with a smaller number of character images, most of the projectors are projecting nothing and only project a character image when it passes through a corresponding projection field (e.g., the projector remains on even when not in use to project an image and often creates an illuminating effect that undesirably leads to a graying effect).

Hence, there remains a need for improved visual display techniques and systems such as for creating an animated character or image on a display surface (such as projection screen or the like) that has high quality even when viewed from small distances (e.g., less than about 10 feet and often less than 5 feet). Preferably such techniques and systems would be inexpensive to install, would require minimal maintenance, and would be configurable to position into small or limited physical spaces. Also, it would be preferable if such techniques and systems would provide a bright image while providing, in some applications, very dark or black surrounding areas such as to hide or not illuminate surrounding portions of the display surface or screen.

SUMMARY OF THE INVENTION

The present invention addresses the above problems by providing projection systems and methods adapted for projecting or displaying images of characters or objects using a projector and a mirror assembly configured to reflect the projector output onto a projection surface or screen within a projection area or projected area/field that represents a fraction of the total screen area or size. The media playback through the projector may be animated characters or objects and may be displayed upon a large screen. To provide a desirable resolution with the media playback, the character/object may be the only content in the projection area and the size of the projection area is chosen to be a fraction of the projection screen or its surface area (such as a 1 to 2 foot diameter circle projected upon a surface that is up to 30 to 40 feet or more in length and up to 5 to 40 feet or more in height). The projection area is moved over an animation or projection pattern or path so as to allow the character or object in the projection area to move over all or portions of the large projection surface or screen (e.g., to provide a second level of animation that can be combined with animation/movement of the object within the projection area). In other words, the movement of the object as projected is compounded by the movement of the projection area on the projection surface or screen. In one embodiment, robotically controlled or motor driven mirrors redirect the image from a video projector so as to precisely recreate the animators' original character movements intended for a large area (e.g., the character was animated with intention of a single, stationary projector projecting the image on the large screen or display surface). All of the resolution of the single projector is directed only to where the character is located as the character is the only projected item of interest (i.e., within the projection area/field), and effective resolution of the entire screen increases by many times (e.g., 10 or more times or the like) when compared with using that same projector to project the same character onto the entire screen surface. The use of a single projector to provide an animated character/object saves cost and complexity relative to systems using numerous projectors (e.g., 90 or more projectors) as well as simplifying media production. Further, since light is only (or substantially only) projected upon the small projection area, the black or non-projection areas may be maintained as truly black.

More particularly, a projection assembly is provided for displaying images on a relatively large surface with motion or animation and with high resolution and brightness. The assembly includes a projector that receives an input image stream and projects images. A mirror assembly is positioned proximate to the projector outlet and has one or more mirrors that are positionable to reflect the projected images onto a display surface at a plurality of positions. The assembly further includes a motor controller assembly that positions the one or more mirrors based on a set of position data that define the plurality of image positions. The image positions define an animation or projection pattern on the display surface for at least one predefined portion of the input image stream.

The predefined portion may be an image of a character and the plurality of positions may be spatial coordinates for the character image on the display surface. The projected images may be provided in a projection area or field that is a fraction of the size of the display surface, such that the resolution and output light of the projector are concentrated on the display surface within this projection area (which may be less than about 9 square feet in some embodiments and typically less than about 2 to 4 square feet). In some cases, the character image may have a size that at least in some frames or portions of the input image stream is about the same as or equal to the projection area. The spatial coordinates may be defined in a source media for the input image stream that is adapted for projecting over most or the entire display surface area (e.g., an animated work adapted for a large projection screen). The character may be animated within the projection area itself (such as by changes in the character between frames of the input image stream) while also (concurrently in some cases) being animated by movement of the one or more mirrors to move the projection area along the animation pattern over a display time period (e.g., the display time period may equal the length of the input image stream and the positions of the projection area correspond to one or more frames of the input image stream as position information may be provided for or derived from the frames of the source media).

In some embodiments, the mirror assembly includes an X-axis mirror and a Y-axis mirror that are each pivotable about an axis. The X-axis mirror and the Y-axis mirror are offset from each other and their axes may be in differing, parallel planes and be orthogonal to each other. The motor controller assembly may include a pair of DC servo motors that are linked to the mirror axes (or pins/shafts attached to the mirrors). The motors are operated by the controller assembly to pivot the mirrors independently (but often concurrently) to move the projected images through the plurality of positions that define X-Y coordinates on the display surface so as to move or animate the projected images by moving them along the animation pattern. The positions of the animation pattern may be thought of as defining a number of X-Y coordinates (or X-Y pairs) that is larger than the number of frames in the input image stream, whereby motion of the projected images (or a character in a projection area/field) along the animation pattern or trajectory appears smooth and/or continuous to a viewer, e.g., more realistic motion than is achievable with changes between frames of an animated work as there are typically 24 to 30 frames per second in such works while the motor controller may operate the motors at interpolated rates up to or exceeding 1000 frames per second.

The input image stream may be generated from a source media that may provide a character image at the plurality of positions on the display surface (e.g., the source media may be adapted to use the whole or large portions of the display surface). The input image stream may be distorted relative to the source media (or he character image within the source media may be predistorted) to account for or limit keystone distortion caused by using the moving mirror(s) to display projected images at offset angles from a perpendicular projection position (e.g., a center of the screen or display surface or the like). It should be understood that there are generally two disparate distortions involved with using projection assemblies that should be considered and addressed: media distortion and motion distortion. To address these distortions, in some embodiments, the media is pre-distorted to compensate for keystone, rotation, and/or scale error introduced by the mirror positions, and the XY position data is, in some preferred embodiments, adapted to allow for the increased amount of position change as the image is projected farther from center (relative to the location of the projection assembly or its outlet).

DETAILED DESCRIPTION OF THE PREFERRED EMBODIMENTS

Figure 1:
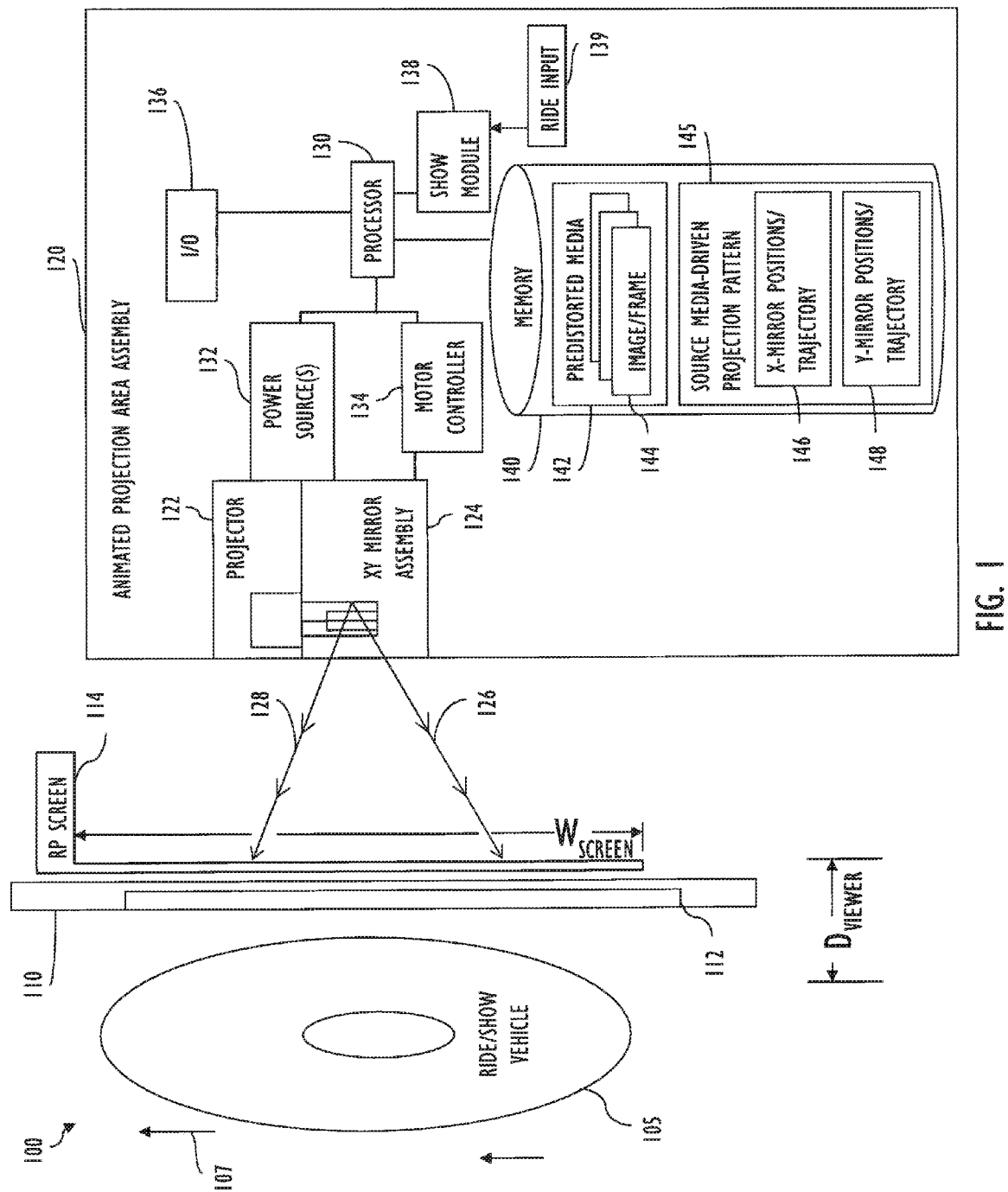
FIG. 1 illustrates a top view of a ride/show system including an animated projection area or moving mirror projection assembly shown generally in functional block form.

Briefly, embodiments of the present invention are directed to projection or display systems, and associated methods, for projecting or displaying an image or character that is animated both within a projection area/field and also by the movement of the projection area/field across a larger display screen or surface (such as a front or rear projection screen, a flat wall, a floor, or a ceiling, or the like). Animation of the image or character is provided by projecting into the projection area/field frames of an animated film/work (e.g., 24 to 30 frames including the image or character) or of a more conventional video or movie (e.g., live action video of a subject with the terms "character" or "image" being broad enough to cover nearly any object that may be animated or moved across a display screen including normally inanimate objects like a ball, a comet, or the like).

Animation or movement of the projection area itself is achieved by pairing output images of a projector with an XY mirror assembly that responds to an input pattern or trajectory to move one or more mirrors to change the X-Y coordinates of the projection area on a display surface (e.g., to move the center of rotation or center of the projection area about the display surface). The input pattern being defined or driven by the position of the particular character or object within a source media (e.g., an animated film/work, live action film/video, or the like). For example, the mirror assembly may include an X-axis mirror and a Y-axis mirror that each may be rotated about an axis by a motor so as to project the image from the projector that strikes and is reflected from both of the mirrors to a particular location on a display surface or screen corresponding to a position of the character within the source media. In this manner, the projected area may be a fraction of the size of the overall projection surface or screen so as to concentrate the light onto this portion of the display surface, and, significantly, to allow all of the resolution (or pixels) of the projector to be used for the character (or for the smaller projection area without a significant number of pixels not being used or wasted). In other words, the area about the projection area may be kept black (or be a true black area rather than a gray area as is the case when projectors project unused pixels upon parts of a full display surface) with the projector light directed by the X-Y mirror assembly just to the projection area, and the resolution of the character/image being animated within the projection area is significantly higher. For example, the image may be provided in a resolution of 1024 by 768 pixels and the projection surface/screen and projection area may be selected such that the projection area is about 1/10 to 1/20 (or less) of the area of the projection screen. In this case, all or most of the 1024 by 768 pixels would be provided or projected within the projection area rather than only 1/10 to 1/20 (or less) of these pixels being in such an area if the projector was used to project onto the entire area of the projection screen at one time (as in common display systems). As a result, the image within the projection area/field appears to be of a very high quality because it has high resolution, higher brightness levels, and higher contrast with adjacent areas of the projection screen which may be truly black.

Figure 2:
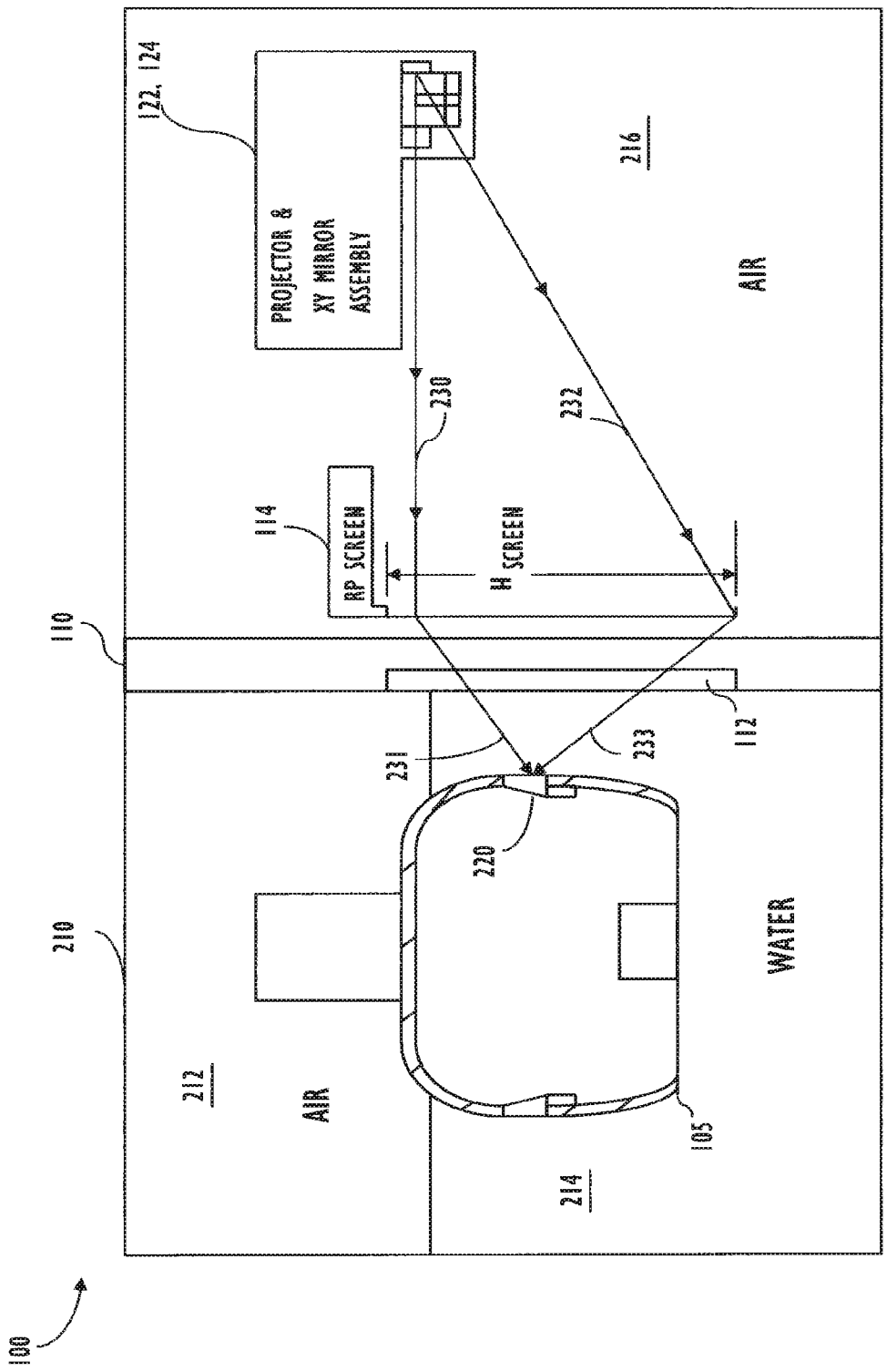
FIG. 2 is a partial side view of the ride/show system of FIG. 1 further showing use of a projector and XY mirror assembly of the invention for projecting high resolution images within a projection area/field that is a fraction or subset of the available projection screen or surface and for moving the projection area along a path or pattern that is defined or driven by a source media (e.g., XY coordinates of a center of rotation of the projection area is moved according to an image (or character) movement or position within the source media)

FIGS. 1 and 2 illustrate a ride or show system 100 that makes use of projection concepts of embodiments of the invention to provide a high quality projected image on a projection surface that, in this case, is positioned proximate to the audience or viewers (such as within 10 feet and often a distance less than 5 feet). The close audience positioning is acceptable in this case because the resolution of the projection area is quite high (such as 1024×768 pixels within a 1 to 2 foot diameter projection area or another useful resolution and/or projection area size/shape may be used). As shown, the ride assembly 100 includes a ride vehicle 105 for carrying an audience or viewers of a display that is moving along a path or track as shown with arrows 107. In this case, the vehicle is shaped like a submarine such that the viewers/audience have their view of the exterior area blocked by walls except for viewing windows or portholes 220, which allows the line of sight or viewing area to be relatively tightly controlled to an area outside the window or porthole 220. The vehicle 105 is caused to ride within water 214 with an upper portion being exposed to air 212 in a vehicle travel area or a show portion 210 of ride or show system 100. Images projected toward the viewers pass as shown with arrows 231, 233 through the water, which provides an effect of being in an actual submarine. Of course, the use of water 214 or portholes 220 are not requirements of the invention as the invention may be implemented in ride systems with open vehicles such that the audience may more freely view a projection surface and projection areas displayed thereon.

In the ride system 100, the riders within the vehicle 105 are entertained with a show that includes an animated character(s) that moves or swims outside the portholes 220. To this end, the vehicle 105 is separated by a show wall 110 from a projection surface 114, which in this non-limiting case is a rear projection screen positioned near a transparent or at least translucent window 112 in the wall 110. A moving mirror projection assembly (or animated projection area assembly) 120 is provided behind the RP screen 114 and functions, as described in detail below, to project a projection area/field onto the surface of the RP screen 114 and to move this projection area/field through a desired projection pattern, path, or trajectory that is defined or driven by a source media for a character/image that is projected within the projection area/field. Note the screen or projection surface may also include a front projected screen or surface (e.g., a front projection screen). The distance, $d_{viewer}$, between the porthole 220 and the RP screen 114 may be relatively short such as 3 to 10 feet or the like, which is often desirable due to tight space constraints of ride systems like system 100 in practice and which is acceptable with the high resolution provided by the projection assembly 120.

The RP screen 114 may provide a display or projection surface that is relatively large such as a width, $W_{screen}$, of 20 to 40 feet or more and a height, $H_{screen}$, of 5 to 15 feet or more, with one implementation using a RP screen 114 that is 35 feet by 7 feet. The projection assembly 120 includes a projector 122 and mirror assembly 124 that function together to be able to provide a projection area/field at nearly any location on the RP screen 114 as shown with arrows 126, 128 that illustrate a full range in the horizontal direction or along an X-axis range and with arrows 230, 232 that illustrate a full range in the vertical direction or along a Y-axis. As discussed earlier, the projector 122 acts to project an animated character or image (such as a character in an animated or live action film) and the XY mirror assembly acts to project this animated character or image within a projection area/field with its center movable along a path or pattern over a plurality of X-Y coordinates on the RP screen 114. For example, a computer graphic or video of a live fish/mermaid may be projected or output by the projector 122 through air 216 onto the surface of the RP screen 114 and the XY mirror assembly 124 may be operated to cause it to swim in a desired pattern/path on the RP screen 114 such as to swim up to and away from a porthole/window 220 in the submarine 105, e.g., by moving a single XY mirror or a paired X-mirror and Y-mirror to project (as shown with arrows 126, 128, 230, 232) a projection area/field that can be smoothly moved in the pattern/path. Hence, the assembly 120 may be thought of as animating or moving a projection area in a pattern on a projection surface such as an RP or other screen 114, and this allows high resolution to be achieved with a single projector 122 while allowing a wide range of movement of the image/character across the display surface (e.g., the character animation is not just within the projection area but is provided with movement of the projection area by XY mirror assembly 124).

The projection assembly 120 may include a processor or CPU 130 that controls operation of the projector 122 and XY mirror assembly 124. Such control may include operating power sources 132 for the projector 122 and/or motors used to rotate mirrors within the mirror assembly 122. The processor 130 may also control feeding of images/frames 144 from memory 140 (or other media input source such as a wired or wireless feed to assembly 120) to projector 122. For example, the projector 122 may be operated by the processor 130 manually via an operator using one or more I/O devices 136 to activate the projector 122 (such as a mouse, a voice control program, a keyboard, a touch screen, or other I/O device) or a show program or module 138 may be run by the processor 130 and ride input 139, such as a vehicle position sensor indicating that the ride vehicle 105 is approaching or is proximate to the window 112 and RP screen 114, may be processed to determine when the processor 130 should activate the projector 122 or feed it image input 144. The media 142 is labeled as "predistorted" as it may be useful in some applications to account for keystone distortion that may occur as the projection area is moved away from a position orthogonal from the assembly 124 to locations on the RP screen 114 that may be at relatively large angles (e.g., that may cause the shape of the projection area and a contained image to change in shape and/or size without such predistortion, with one correction method discussed below).

The control of the XY mirror assembly 124 may be accomplished with a motor controller 134 that operates, in one embodiment, a first motor to pivot an X-axis mirror about a shaft or center axis and a second motor to pivot a Y-axis mirror about a shaft or center axis. The motor controller 134 generally operates to cause these motors to position the mirrors so as to project the character or image within a projection area/field with X-Y coordinates of its center of rotation or center point being selected based upon a source media-driven projection pattern 145. This pattern 145 is taken from or derived from character or image positions within a source media (such as an animated film or live action movie intended for projection upon full size display surface such as the RP screen by a single, still projector). These character positions from the source media are used to generate a set of X-mirror positions (or its trajectory) 146 and a set of Y-mirror positions (or its trajectory) 148 that are stored in memory 140 and used by the motor controller 134 to drive mirror motors to properly position the X mirror and the Y mirror with the mirrors being independently operated but their movement synchronized to achieve a fluid movement of the projection area/field along the defined pattern 145.

Figure 3:
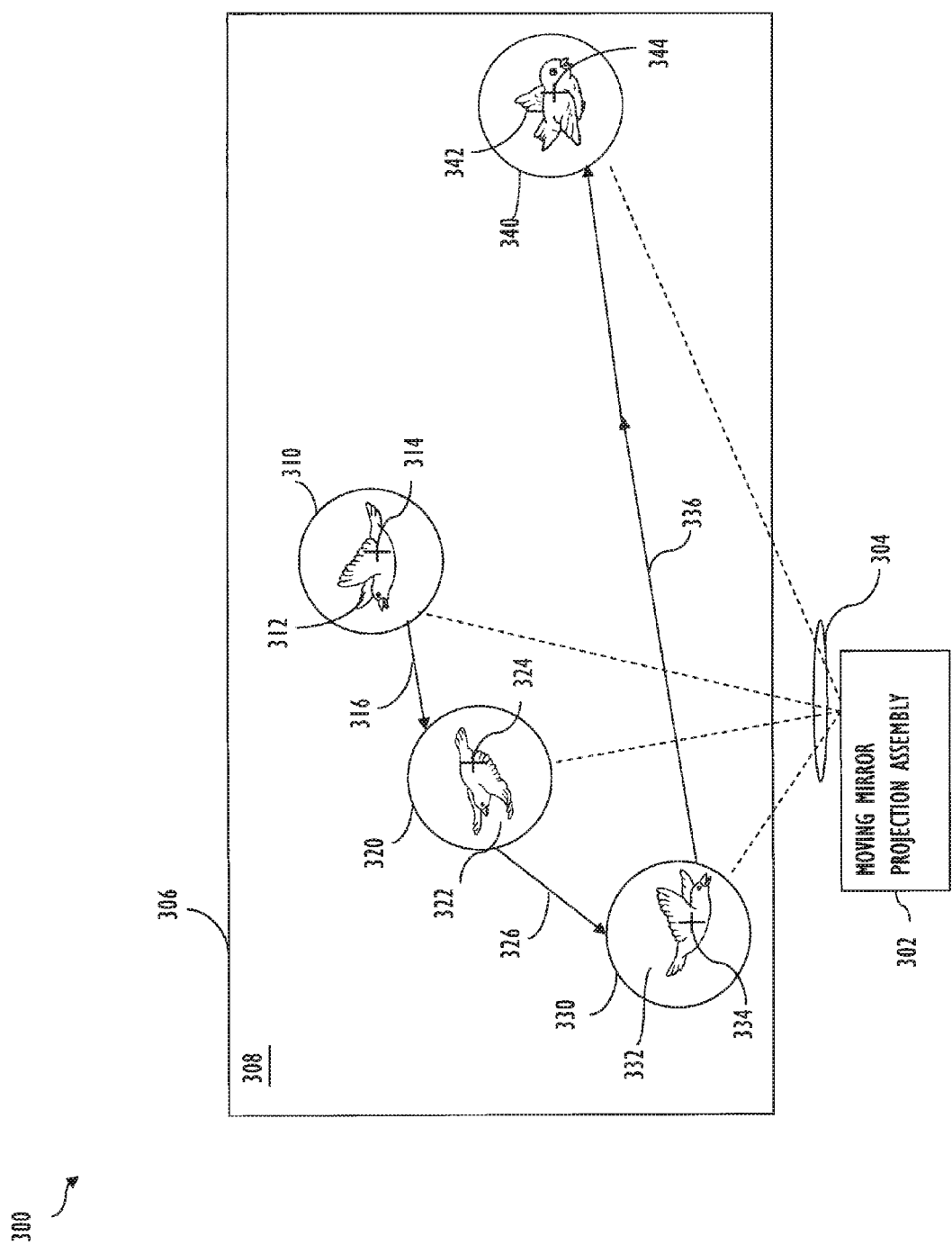
FIG. 3 illustrates a projection system of an embodiment of the invention showing use of projection assembly with moving mirrors to move a projected or projection area through a media-driven animation pattern upon a display surface (such as a rear or front projection screen)

FIG. 3 illustrates a projection system 300 that may be used to create a display or visual effect according to an embodiment of the invention. As shown, the system 300 includes a projection surface 306 such as an RP or other type of projection screen or simply a wall, floor, ceiling, or other surface. A moving mirror projection assembly 302 is provided and positioned to project on the surface 306 (which may be nearby or relatively far away such as up to about 20 feet or more away), and the projection assembly 302 may contain components as shown in FIGS. 1 and 2 (or as shown in FIGS. 5-8 below) to project or output images 304 that are projected onto the surface 306 in projection areas/fields (e.g., with a particular shape and size) that are each typically a subset or fraction of the area or size of surface 306.

Significantly, the projection assembly 302 is adapted to cause the projected images to move such that the X-Y coordinates of the projection area/field follow a predefined pattern or a pattern/path that is defined in real time or "on the fly" (e.g., in response to some input stimuli or data such as a position sensor that the assembly 304 reacts to so as to position the projection area relative to a moving object). Other portions of the surface 306 are non-projection areas or background portions 308 that may, if desired for an application, be maintained black or non-illuminated because the projection assembly 302 only projects upon a projection area (e.g., all or substantially all of the light 304 output from the projector of the assembly 302 is contained within or directed into the projection area 310, 320, 330, 340 by the positioning reflectors or mirrors).

The pattern shown in FIG. 3 is overly simplified for clarity sake. As shown, a projection area 310 is generated by the projection assembly 302 at a first time such as at the start of a pattern or trajectory of the character or image for a show/effect. The projection area 310 in this example is circular in shape and may be several inches to several feet (or more) in diameter, with one embodiment using a diameter of about 18 inches. In other cases, other shapes are used such as to suit a particular character/image shape and can be set or adjusted through the use of an aperture or stop in the projection assembly (e.g., upstream or downstream of the mirrors or the like). Again, the size of the projection area 310 is typically a small fraction of the surface 306 so as to concentrate the output light and resolution of the projector of assembly 302 on just a portion of the surface 306 (e.g., to allow the image 312 to be viewed from a short distance without loss of resolution and/or to increase the brightness/sharpness/color of the image 312). An animated character or image 312 is displayed within the projection area/field 310, and the character 312 is "animated" in the sense that it is a projection of numerous frames per second (such 24 to 30 or more) and typically will be changing between at least some of these frames to be animated or in motion within the projection area/field 310. In some applications, just the image 312 is projected in the area 310 while in others background or additional images may be included in the projected images 304 and shown in area 310 while in other cases more than one character or image 312 is included (e.g., "character" or "image" here is intended to include one or more objects or characters that can be animated in area 310).

The projection or projected area 310 is positioned at a first position in a path or pattern with its center or center of rotation 314 at a particular X-Y coordinate (e.g., a center of the surface 306 or some other location). The character or image 312 is animated in a second or additional manner by operating the projection assembly 302 to move the projection area to a second position as shown with arrow 316 (moving the same projection area to a new position or creating a second projection area 320 with its center 324 having differing X-Y coordinates from 314). As discussed below, the movement 316 is smoothly accomplished and the movement 316 is chosen based upon a source media to provide a desired projection or animation path or pattern (e.g., the movement 316 may be tied to or correlate to the animation within the areas 310, 320 such as by moving very little when the animation of the character indicates the character is stationary and then moving to the left (or other direction) at a speed indicated by the animation of that character within the areas 310, 320 such as swimming quickly or slowly to the left or other direction "causing" or being linked to movement 316).

The movement 316 is continuous due to the characteristic of the projection assembly 302 that it continues to project images 304 even while the movement is occurring such that in practice there would not be separate projection areas as shown for ease of illustration but instead the projection area 310 would simply appear to move 316 to where area 320 is shown. Such movement may be very quick or may take several seconds and, as such, the projection area 310 may be produced by displaying one to many frames of the source image during the move. In other words, the image/character 312 may be animated in a manner that coincides with the movement 316 to the new location/projection area 320 (such as a fish animated to be swimming in a particular direction, a bird flying in that direction, a person walking in that direction, and so on), and, in such a manner, the movement 316 may be tied to or linked to the animation or changes of the image 312 displayed within the projection area 310.

The pattern or X-Y positions used by the projection assembly 302 to position the mirrors may cause the projection area 320 with displayed image 322 to move 326 to a new position or to provide a third projection area 330 with its displayed image 332 in a new X-Y coordinate position as defined by the center of rotation 334. Further, the pattern may then require the projection area 330 to be moved 336 to another or fourth position as shown with projection area 340 having its image/character 342 displayed in a differing X-Y coordinate position as determined in part by the location of its center 344. Again, these movements 316, 326, 336 define a pattern or trajectory of the projection area (and its contained image/character) on the surface 306 and the movement typically is not abrupt but instead smooth or continuous, which may have been better depicted in the system 300 with numerous projection areas that overlap with each other that follow the pattern defined by the path or arrows of 316, 326, 336. In practice, each frame of the image 304 output by the projection assembly 302 typically will have an X-Y coordinate associated with it such that the mirrors of assembly 302 may be moved or have their position set for each frame (e.g., 24 to 30 mirror positions for both the X and Y mirrors although movement is not required such as when it is desirable to keep the image 312 stationary for a period of time or number of frames such as near a porthole of ride 100 for a period of time while a character 312 "talks" to the audience).

Figure 4:
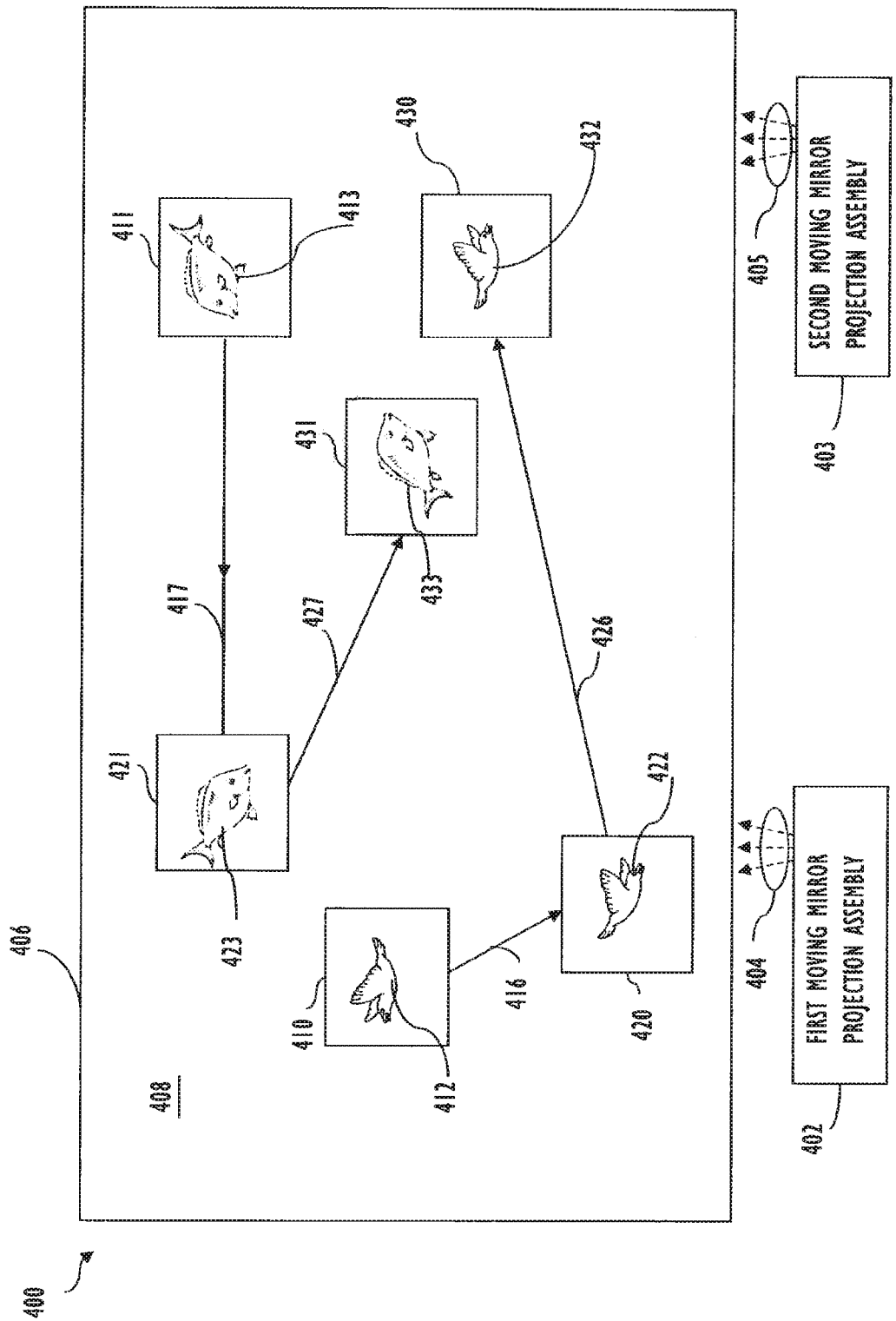
FIG. 4 illustrates a projection system similar to that shown in FIG. 3 but using more than one projection assembly to provide two images/characters of a media or image source in distinct and separate projected or projection areas that may be moved in unique animation patterns that may be synchronized to have the images/characters interact or may be unsynchronized and/or unrelated patterns.

FIG. 4 illustrates another display or projection system 400 in which a pair of moving mirror projector assemblies 402, 403 are provided to create an effect where images within two projection areas/fields may interact aid move independently about a projection surface. As shown, the system 400 includes a display surface 406 with a background or non-projection area or portion 408 (e.g., black areas framing projected images). The first projection assembly 402 projects or outputs a first set of images 404 and tile second projection assembly 403 projects or outputs a second set of image 405 onto the display or projection surface 406 (e.g., an RP screen or the like). The first projection assembly 402 may be operated to provide a first animated image (using a first set of input images/media) that is caused to travel over a first pattern or trajectory while the second projection assembly 403 may be operated concurrently (or separately) to provide a second animated image (using a second set of input images/media) that is caused to travel over a second pattern or trajectory on the display surface 406.

As shown, the first projection assembly 402 may generate a projection area 410 in a first X-Y location while the second projection assembly 403 may generate concurrently (or at an earlier or later time) a projection area 411 in a second, different X-Y location. As shown, the projection areas 410, 411 include differing characters/images 412, 413 (but they could include similar ones) and have like shapes such as square projection areas that are a fraction of the size of the surface 406 (such as 1 to 2 feet on a side with the surface being up to 40 feet or more on a side and other shapes may be used and the shapes may differ to create a particularly desired effect). Again, the characters/images 412, 413 typically would be animated or in motion within the projection areas 410, 411, and secondary or additional motion/animation is provided by moving the projection areas 412, 413 as shown at 416, 417 to provide second projection areas 420, 421 (or new positions for the projection areas 410, 411 as discussed above) with images/characters 422, 423 having new (and typically different or spaced-apart) X-Y-coordinates. The movements 416, 417 may be concurrent (or partially concurrent) or serial with one performed before the other. These movements 416, 417 create a projection or animation pattern for the characters (and/or the associated projection areas). This pattern continues with further movement 426, 426 to new X-Y coordinates for projection areas 430, 431 and the images 432, 433, with this position being chosen to cause the images 432, 433 to be proximate to each other and allow interaction (such as to have to images approach each other to converse, play, or the like). Additional projection assemblies may be provided to allow additional character/images to interact or simply to provide a display with multiple animated character and/or objects with the projection patterns/paths chosen to achieve a desired effect or to comply with a single or multiple source media (e.g., to provide paths/trajectories of images that correspond to the movement of the image in the source media for example if it were projected onto a large surface/screen with a single, stationary projector).

Figure 5:
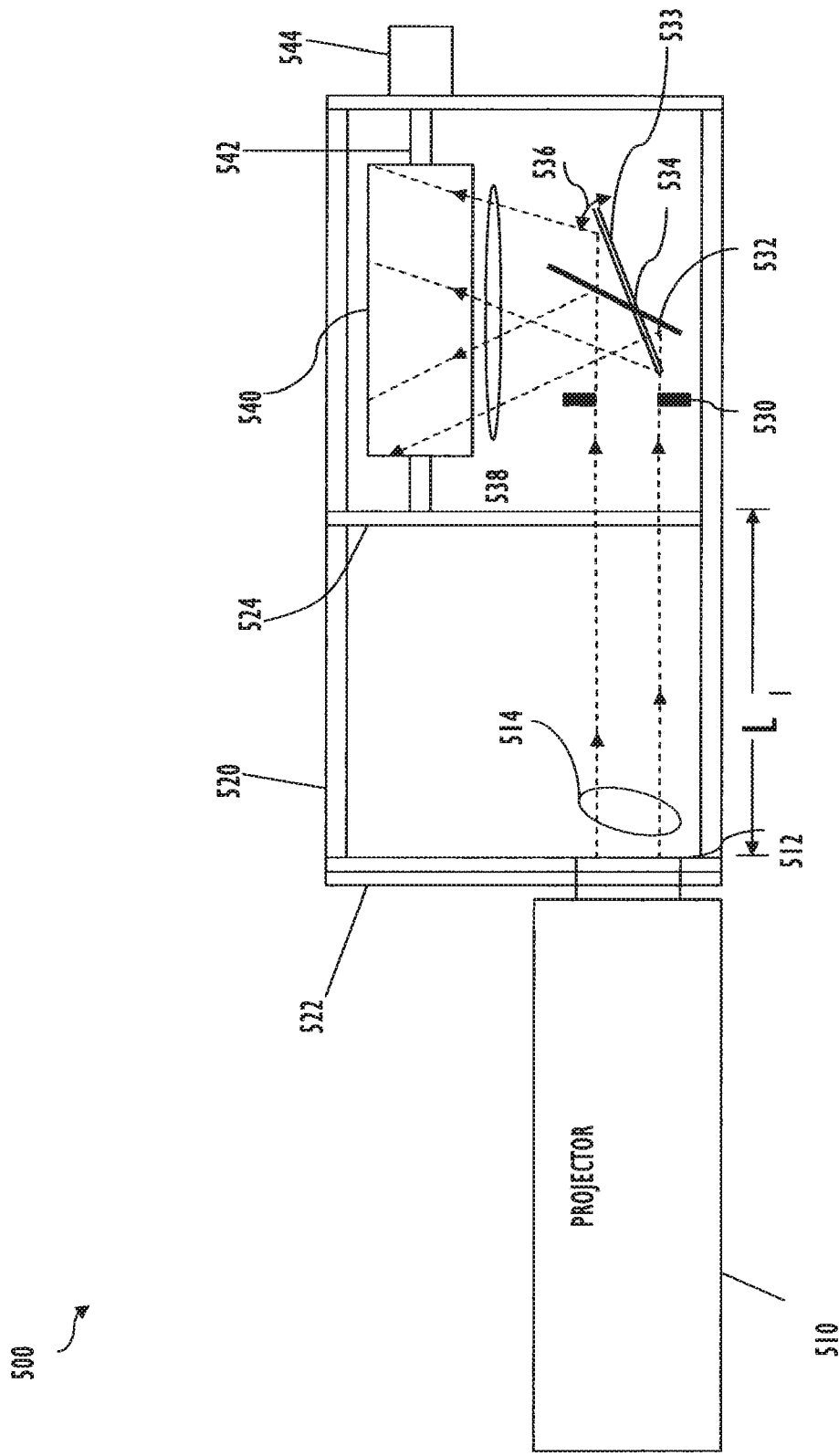
FIG. 5 is a side view of a moving mirror projection assembly shown functionally with a side of a mirror housing removed to illustrate operation.
Figure 6:
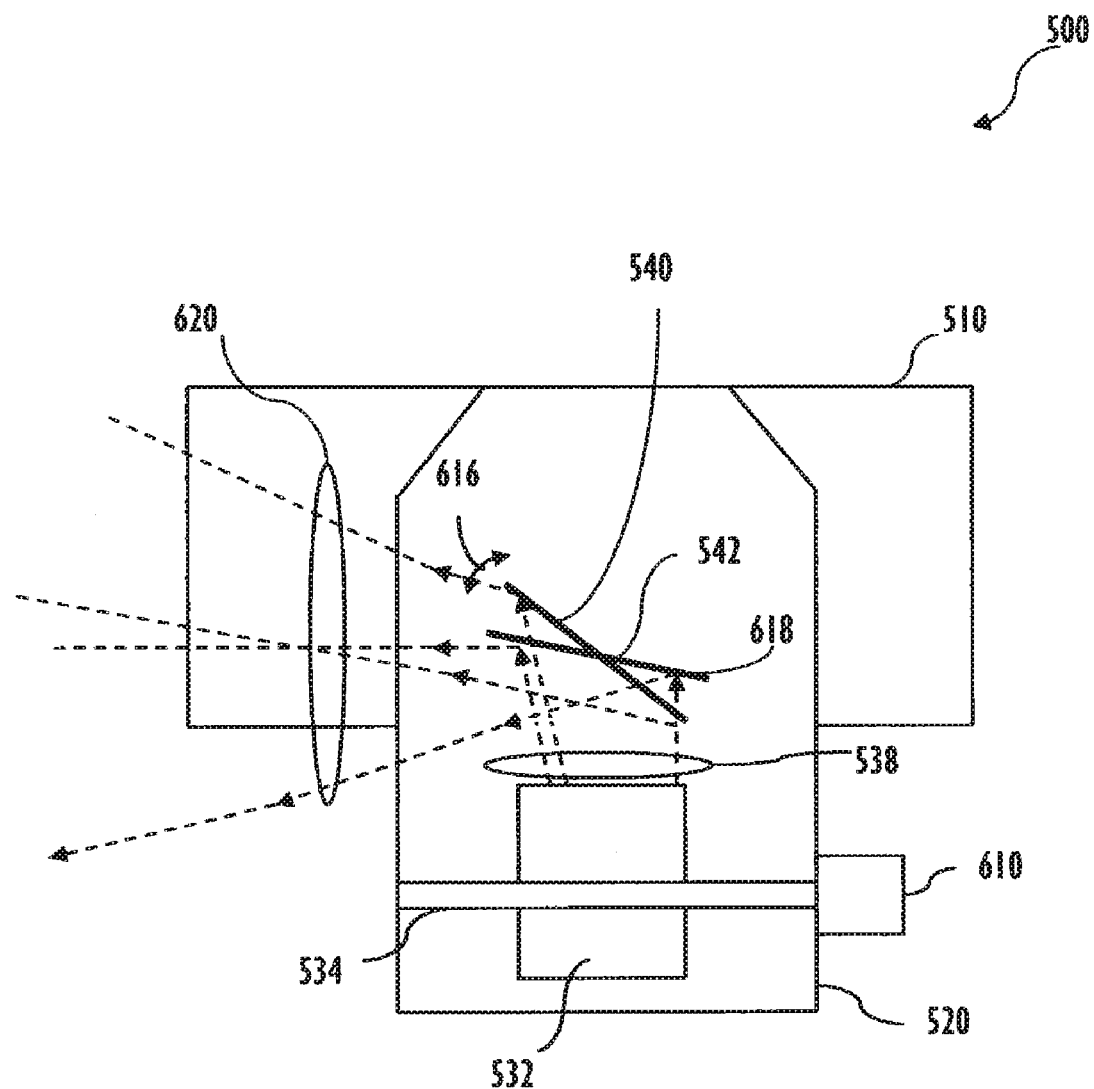
FIG. 6 is an end view of the assembly of FIG. 5 again with a wall/side removed from the housing better illustrate internal operations of the assembly to provide a moving or animated projection area that have numerous X-Y coordinates (e.g., follow a predefined pattern or a pattern created in response to input stimuli such as motion sensor signals)

FIGS. 5 and 6 illustrate in more detail one embodiment of a moving mirror projection assembly 500 (such as may be used in the system 100 of FIGS. 1 and 2 or systems 300 and 400 of FIGS. 3 and 4). As shown, a projector 510 is arranged with its output or output lens 512 inserted into or adjacent an end wall 522 of a mirror housing 520 such that its output images (or transmitted or projected light) 514 enters the housing 520 and passes through an interior support structure or wall 524. The projector 510 may take many forms to practice the invention and generally may be any device that can be used to display images upon a display screen or surface such as readily available film/movie or digital video projectors. The assembly 500 is often used to project onto a relatively small projection area on a nearby screen/surface, and, as a result, a less expensive, low output projector may be used for projector 510 (but other embodiments may use more expensive, high output projectors), e.g., the light is concentrated upon a small, nearby area such as a circle with a diameter of 18 inches or so on a projection screen or surface rather than dispersed across an entire surface. In one embodiment, the projector 510 used is a 5000 ANSI lumens, 1024×768 resolution projection such as available from Panasonic Corporation of North America (e.g., the Panasonic 5600 or similar model) but, of course, the invention may be practiced using other projectors with differing resolutions and/or outputs.

The images from the projector 514 travel within the housing 520 until they strike the surface of a first mirror 532, which may be an X-axis mirror (or Y-axis in some embodiments). Prior to striking the mirror surface, the light 514 may be sized/shaped by passing it through a stop or aperture 530. For example, it may be desirable to provide a circular, oval, rectangular, square, triangular, or other shape for the projection area, and the hole or opening in the stop may be selected to provide such a shape. Further, the stop 530 may be used to trim or block excess or unneeded light from the image 514 such that the majority or a large portion of the light that strikes the mirror 532 corresponds to the image or character to be projected on a surface by the assembly 500, with the size and shape of the opening in the stop 530 being chosen and tailored to suit the particular character or characters in the projector output 514 and distance from the stop 530, which is defined in part by the length, $L_1$, from the projector output 512 to the interior support wall 524. The aperture 530 acts to soften the black edge of the projection, blending the video black into the true black where nothing is being projected while also hiding the hard rectangular edge of the projector output.

The X-axis mirror 532 is pivotally supported on the sidewalls of the housing 520 and is moved about its center axis by motor 610 as shown by second position 533 and arrow 536. For example, a shaft or pin 534 may extend from a first end where it is attached or linked to a drive motor (or X-axis motor) 610 to a second end where it is pivotally attached/supported by a sidewall of the housing 520. The motor 610 operates in response to X coordinates or positions received at a motor controller (not shown) and rotates the shaft/pin 534 to rotate 536 the mirror to various positions as shown at 532, 533 to cause the reflected images 538 to have a desired X coordinate or horizontal position.

The reflected images 538 then travel in housing 520 toward the surface of a second mirror or Y-axis mirror 540 that is pivotally mounted in the housing 520 to move or rotate 616 generally about its central axis as shown with second Y-axis mirror position 618, The Y-axis mirror 540 is also supported by a shaft or pin 542 that is attached or linked at one end to a drive or Y-axis motor 544 and at a second end it is pivotally attached to the inner support wall or structure 524 of housing 520. The two mirrors 532, 540 are spaced apart to allow free rotation about the support pins/shafts 534, 542 and are arranged such that the rotation of the Y-axis mirror 540 defines or sets the vertical position or Y-axis coordinate of the projected image (or center of rotation of the projection area). This is achieved in part by having the support pins/shafts 534, 542 extend orthogonal to each other in spaced apart, parallel planes. The mirrors 532, 540 may take many forms to practice the invention with the illustrated embodiment having the first or X-axis mirror 532 be rectangular in shape and smaller than the Y-axis mirror 540 (such as a rectangle that is about 2 to 6 inches in width and 4 to 10 inches in length with it being understood that the size and shape of the mirror 532 is not limiting to the invention). The rotation of the X-axis mirror 532 generally is limited first to a range that causes the image 538 to always strike the Y-axis mirror 540 and also to suit the display surface (e.g., will be limited to keep horizontal or X-axis travel of a projected image/character upon a display surface). The Y-axis mirror 540 is shown to be generally rectangular in shape, also, and may be about 3 to 6 inches in width and 8 to 16 inches in length; again, the shape and size is chosen in part based on the projection surface/screen and the amount of rotation of shaft 542 is chosen such that the reflective surface can be contacted by reflected images 538 and also to limit travel of a projected image 620 to a vertical or Y-axis travel that suits the projection surface/screen's size and/or shape.

The motors 544, 610 may take many forms to practice the invention and may be high precision DC servo motors or the like (e.g., typically not stepping motors but instead servo motors or similar motors that may be useful for X-Y tables, machine tooling/factory automation, and other applications where carefully controlled bi-directional positioning/rotating of a shaft is desired) so as to provide rapid and smooth movement/rotation of the attached shafts 534, 542. For example, servo motors with encoder counts of over 150000 counts may be used such as ones with 180000 count encoders or the like so as to provide fluid movement of the two mirrors 532, 540 and of the projected characters/images as the projection area/field is moved along an animation pattern. Some applications of the motors 544, 610 are able to provide numerous position changes per second such as up to 60 positions or more per second (e.g., to allow one or more than one position move per frame of the projected video/film or the like). Note, the motor chosen may limit the size of a movement of a projected area per unit time and in other cases the animation effect dictates a slower than maximum speed motor capacity projection area movement/animation so as to more closely match a realistic or desired motion of the character or object being animated (e.g., movement of projection area may be set to substantially match a speed of movement such as running, swimming, flying, falling, etc. of the image/character).

From the embodiment of projection assembly 500, those skilled in the art will readily understand that numerous arrangements of mirrors, stops/apertures, image outlets, and XY mirror configurations and positioning may be used to provide the function of projecting an image/output of a projector onto a projection area/field that can have its X-Y coordinates chosen to match an input pattern/trajectory. Also, the discussion of X-Y coordinates can readily be expanded or interpolated to nearly any useful coordinate system and the inventive aspects described are not limited to a planar screen. For example, the projection systems of the invention may be used with a dome shaped projection surface such as those used in planetariums and the like (e.g., to display a space station, a space craft, a shooting star, or the like on a spherical screen). In other cases, the display surface may include more than one screen and such multi-screen or display surface implementations may include screens in differing planes and some of these planes may be non-parallel relative to each other and may even be transverse or orthogonal to each other (e.g., the coordinates for the mirror projector assembly may be multi-dimensional).

Figure 7:
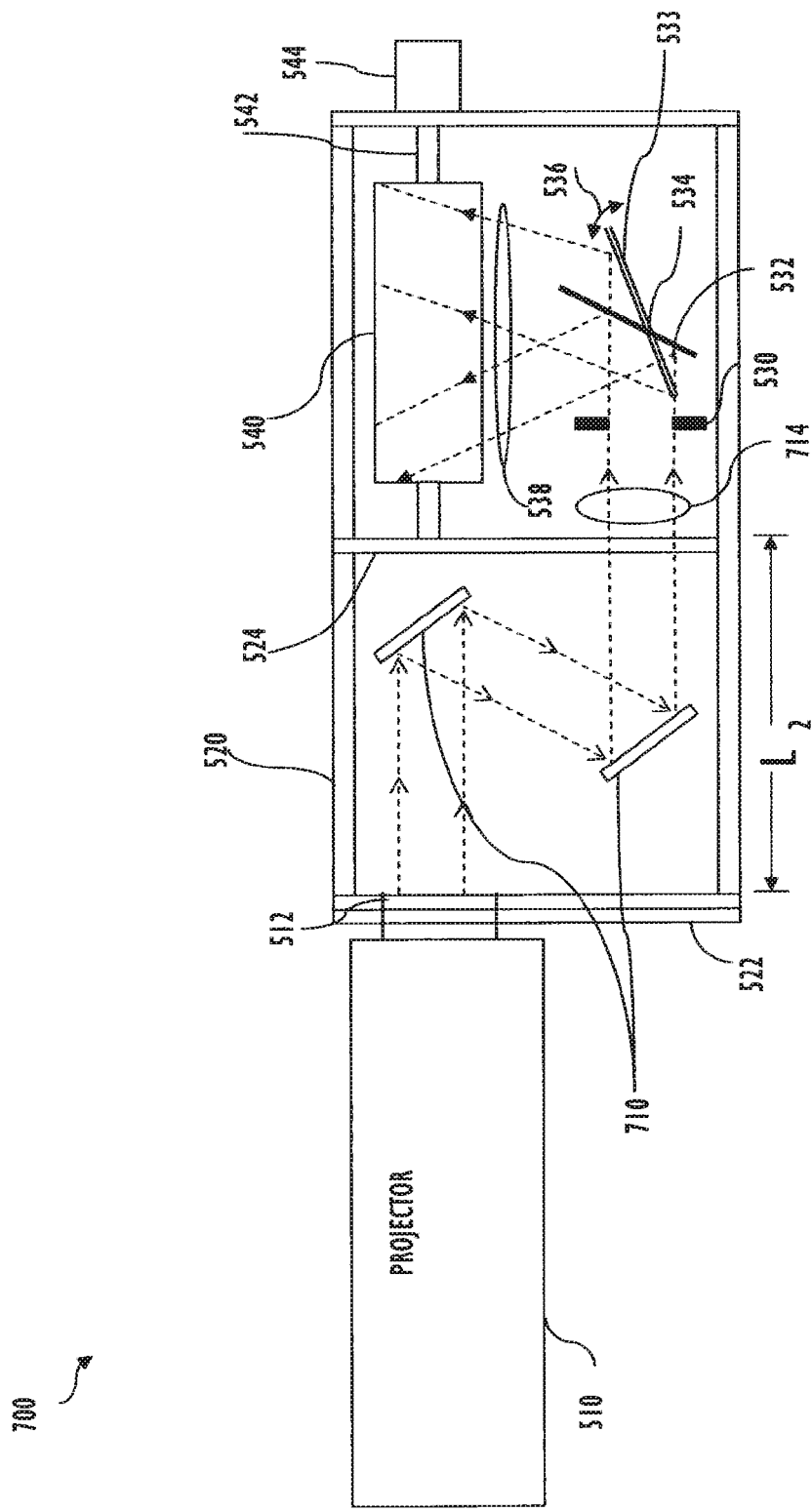
FIG. 7 illustrates another embodiment of a moving mirror projection assembly similar to the assembly of FIG. 5 but including folding mirrors to redirect projector output images to allow desired configuration of the mirror housing (e.g., reduce its length)
Figure 8:
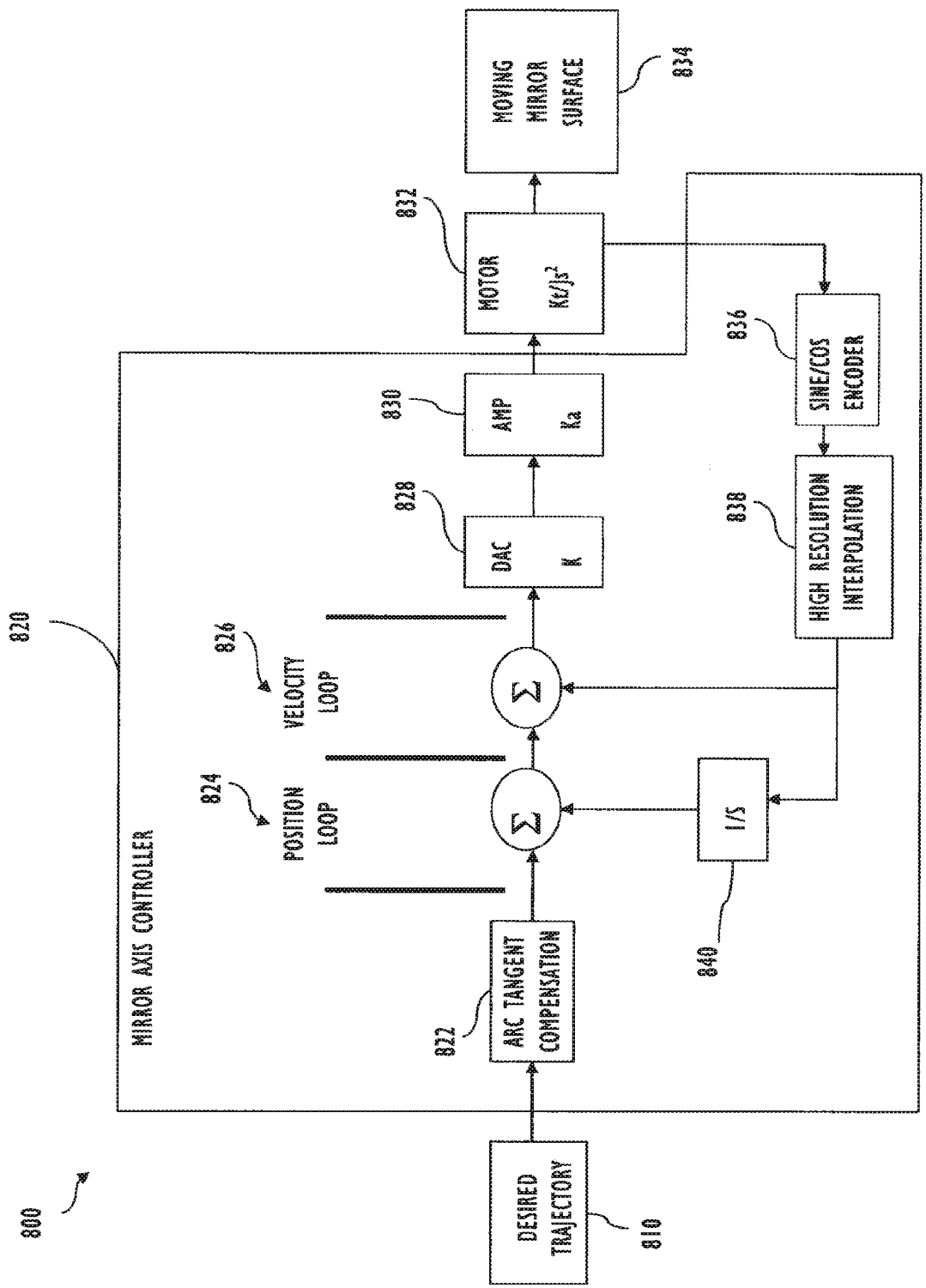
FIG. 8 illustrates a mirror axis position controller of an embodiment of the invention such as may be used in a projection assembly to control operation of the mirror positioning motor to obtain desired X-Y coordinates of an output image of a projector.

For example, space or other restraints may require that the housing 520 be more compact. FIG. 7 illustrates a moving mirror projection assembly 700 with components similar to that shown in FIG. 5 for assembly 500 but having a more compact (less long) housing 520. As shown, the length of the housing 520 is reduced by shortening the distance between the wall 522 to which the projector 510 is attached or mated and the interior support or structure wall 524 (e.g., L2 is less than L1). This is achieved in this example by the inclusion of a pair of folding or redirecting mirrors 710 whose output 714 is then directed through aperture 530 and onto the first or X-axis mirror 532. Other arrangements may also be used to provide a desired flow of the projector output image 514 or 714 to the X-axis mirror 532, but the one shown is useful for providing a reduction in length of the housing of up to about 40 percent.

In practice, the actual movement of the mirrors demands relatively high precision and repeatability from the motors (e.g., the X-axis motor and the Y-axis motor) as well as from feedback devices and other control components (which may all be grouped into or labeled a motor controller for purposes of this description) so as to produce image motion on a display surface or screen that is smooth and tightly controlled (e.g., so that the movement of the projection area/field in which a character or object image is displayed is smooth or not jittery and is precise along a particular animation pattern or trajectory). In one embodiment, this is achieved by providing a mirror control assembly 800 that includes a mirror axis controller 820 that receives as input desired trajectory or positioning data 810 (such as from a processor or show control program) and outputs signals to operate a DC servo motor 832 so as to rotate/position a movable mirror surface 834 (note, other motors may be used in some applications such as high end step motors or non-servo-type motors).

The mirror axis controller 820 may be provided using a variety of circuit components and configurations and generally includes several functional and/or signal processing components including an arc tangent compensation module 822, a position loop 824, a velocity loop 826, a digital to-analog converter 828, and an amplifier 830 (e.g., to close the current loop) that is connected to the motor 832. Note, one controller 820 is shown and, typically, a similar controller would be provided for each mirror or each mirror axis. To enhance precision and repeatability, the controller 820 further includes a feedback loop with an encoder 836, a high-resolution interpolation module 838, and an integrator or integration module 840. The encoder 836 may be a high resolution encoder to allow the system 800 to resolve small movements of the motor 832 and attached/driven mirror surface 834 such as movements as small as 10 arc seconds, with one arc second being 1/3600th of a degree.

In addition to the high degree of spatial resolution provided by controller 820, the desired trajectories 810 (e.g., based on 30 frames/second animation data) may be interpolated by the controller 820 at a high rate (e.g., over about 2 KHz) to allow more precise and smooth motion of the mirror surface 834 (and resulting or produced character or object in a projection area/field on a display surface), when compared to the static projection of 30 or 60 discreet video frames per second. The components of the controller 820 may be implemented using various forms of hardware (e.g., custom or off the shelf ICs and the like), firmware, and software or combinations thereof (e.g., one or more of the hardware devices shown in FIG. 8 may be replaced completely or in part with software devices).

The moving mirror display or projection systems described herein were created with two main design goals in mind. First, the systems can be used to faithfully recreate character motion from an original animation or other source media with a set of moving mirrors (e.g., to move the character in its projection area across a larger display area as if projected with a fixed or non-moving projector over the entire surface using the source media). The moving mirror assemblies are adapted to allow all the resolution and brightness of an inexpensive or other projector to be concentrated where it is needed, i.e., on the character or object in the projection area. No pixels are wasted on areas of the screen or display surface where nothing is being shown. Since no light is sent to these other areas, the black areas of the scene maintain complete darkness. Second, the moving mirror system creates a realistic, smooth character motion along the animation or projection pathway or pattern that is not achievable with other projection systems including a single static projector (e.g., the use of mirrors moved with high precision DC servo motors provides smoother motion/animation of a character based on its position data from the original or source media than animation within that source media).

It may be useful at this point to discuss in more detail an implementation of a projection system of the invention similar to that shown in FIGS. 1 and 2 (e.g., for a submarine ride), design challenges, and useful solutions generated or used by the inventors. One design criteria for the ride system and associated projection/display assembly was to project an animated character that appears just outside of the viewer's submarine porthole while also maintaining realistic detail of the character within a dark environment (e.g., to simulate undersea conditions). In this application, each projection area (e.g., RP projection screen) was approximately 35 feet long and 7 feet high while the character was to be about 18 inches long (e.g., an animated fish), with 3 such areas or screens used to service a show portion of the ride system. Viewers were spaced apart from the screen by about 4 feet. Existing projection systems typically would have provided stationary projectors blended to cover the total area, but the result is low-resolution characters or objects with unacceptable black levels (e.g., the non-projected areas appear gray or even lighter) and high media production costs. In some cases, many projectors are required to cover the area and each would have a dedicated playback device.

Another design criterion was to create projected animated fish that could interact and come into "contact" with a mechanical feature (e.g., a mechanically animated jellyfish for example). In this display embodiment/application, a screen is suspended just over the mechanical/physical feature (e.g., over/adjacent and proximate to the jellyfish to allow the projected image/character to be shown near the physical feature). In this embodiment, prior projection techniques were not useful as they produced unacceptable black or background levels of light that displayed or revealed the screen, which ruined the effect of a real structure interacting with an animated character or image. In contrast, the use of a moving mirror projector assembly with the strategically positioned display surface or screen allows the character to be displayed with animation and with a truly black background about the projected image (e.g., no light is projected outside the projection area/field).

For an embodiment with a 35 foot by 7 foot projection surface, a desired resolution of about 800 pixels to show or display an 18-inch character equates to an effective resolution of 18,667 by 3733 pixels. Tiling 90 projectors and having 90 synchronized HD playback devices may be used in some cases to address the resolution problem, but this would be expensive and complicated and most of the projectors would be projecting nothing (but a small amount of light that makes the non-projected areas gray) except for the brief moments when a character passes through a specific projection field/ area corresponding to the projector. In contrast, a moving mirror projection system may include a projector assembly (as described above) for each character in a scene (such as 1 as shown in FIG. 3, 2 as shown in FIG. 4, or 3 or more as needed to provide the number of characters desired for a scene/show). The moving mirror projection assembly functions to concentrate all of their resolution (e.g., 1024 by 768 pixels or the like) wherever the character travels about the projection surface (e.g., across or along its projection or animation path/pattern) by moving the paired XY mirrors (or through the use of a single XY mirror in some applications). Hence, the moving mirror projection systems of the invention are able to achieve enhanced resolution within the projection area.

Improved brightness is also achieved with use of the moving mirror projector assemblies. By concentrating the light from a large format projector (or other projector/display device) into a smaller space (e.g., a relatively small projection area/field) by use of long focal length lens (or the like), the light associated with a character/image is also concentrated, thereby creating a proportionally brighter image. For example, if a projector is used to project over an entire projection surface the brightness of the character will have a first value but when the same projector is used to project onto a projection area that is ⅛ to ⅟₅₀ (or a smaller fraction) of the surface the brightness is increased by 8 to 50 times (or more). The moving mirror projection systems allow the use of less expensive, low output projectors to achieve significantly improved character brightness even when compared with high output, large format projectors if these projectors are forced to cover the entire projection surface. Super dark blacks are also achieved with use of the moving mirror projector assemblies. The moving mirror projector assembly only sends light where it is needed to display a character (e.g., a projection area containing the character's image), and in this manner, no light is being sent by the projector anywhere, which results in complete blackness in non-projected areas.

Another benefit that has been achieved or identified in the projection systems described has been smooth motion of the character when the projection areas are moved along the animation or projection patterns or trajectories. The moving mirror system is able to achieve smooth, ultra-realistic motion that is generally not possible to achieve with non-moving projectors. Standard projection systems rely on the changes in position between different frames of media to create perceived motion such as 30 frames per second or 60 fields for video and 24 frames per second for film. The moving mirror projector assemblies create continuous motion with no motion artifacts or "stuttering" of the image. Combined with high resolution and brightness, the smooth motion provided by the moving mirrors creates a hyper-realistic quality to the animated characters that would otherwise not be possible or practical.

Figure 9:
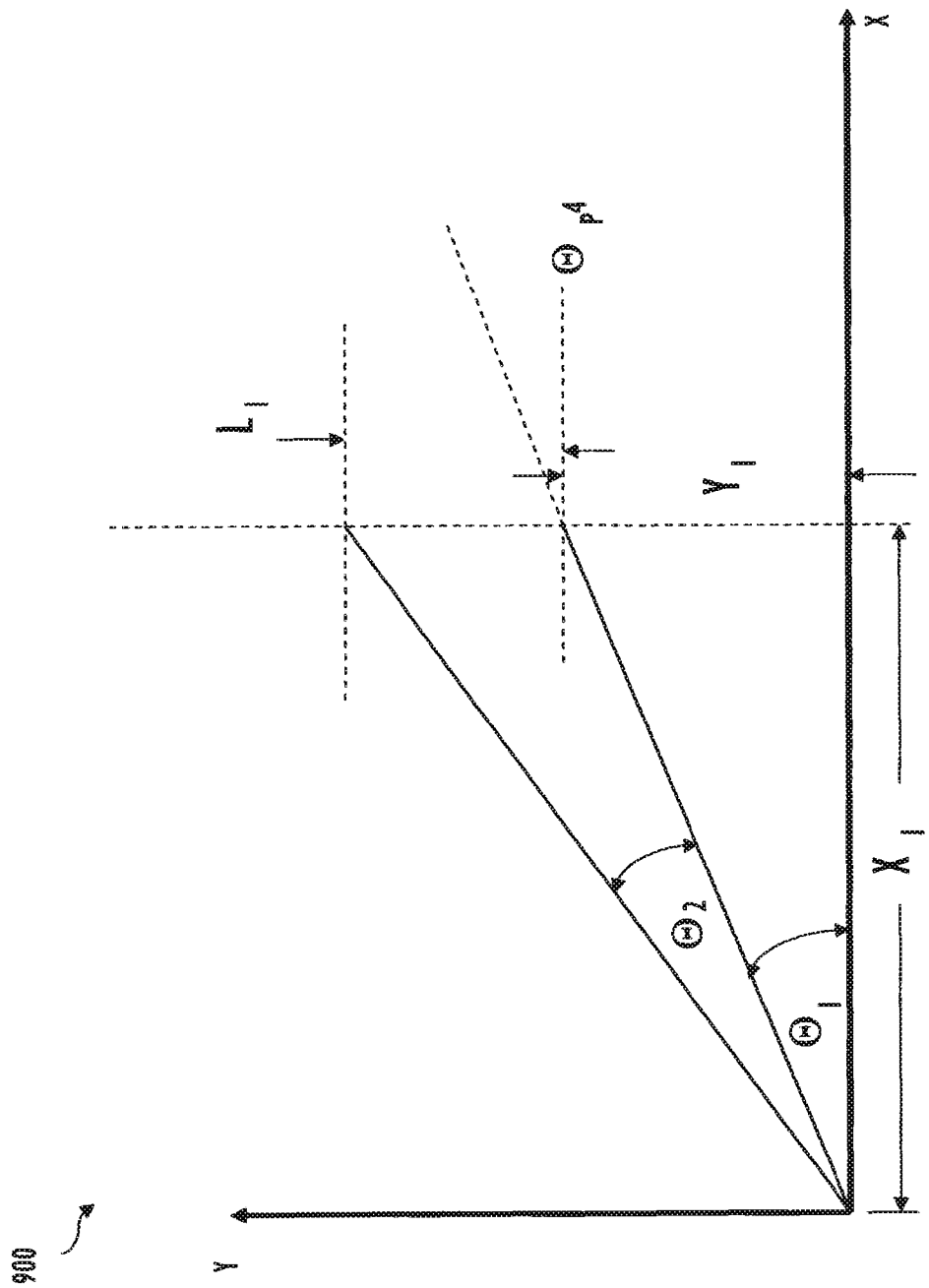
FIG. 9 is a graph for use in determining arc-tangent corrections for rays reflecting from mirrors in a projection assembly.

However, one challenge that may occur with the use of moving mirrors to create character motion/animation is motion distortion correction. In some embodiments, it may be useful to provide corrected, near-rectilinear motions on the projection surface/screen. The motion of the mirrors may be modified based on the geometry of ray traces reflecting off a rotating mirror surface. The graph 900 of FIG. 9 is useful for making such corrections of rays reflecting off a surface. Correction can be determined by determining $\theta_2$ given or knowing $L_1$, $\theta_1$, and X using the following:

$$\tan(\theta_1+\theta_2)=(L_1+Y)/X$$

$$\theta_1+\theta_2=\tan^{-1}((L_1+Y)/X)$$

$$\theta_2=\tan^{-1}((L_1+Y)/X)-\theta_1$$

$$\theta_2=\tan^{-1}((L_1+Y)/X)-\tan^{-1}(Y/X)$$

Bouncing the projector output or beam off two mirrors compounds this problem as the distance that the principle ray travels increases with increasing deflection of the first (or X-axis) mirror. Thus, the non-linearities of the second (Y-axis) mirror are different depending on the position of the X-axis mirror. This correction of the mirror trajectories is done in some embodiments both in a preprocessing step for the position data from the source media and in an interpolation step at run time in the motion or mirror motor controller(s). A graphical user interface or other device may be used to allow users to make in-the-field or additional modifications to the distortion corrections (pre-processing step) and obtain immediate results/feedback on their modifications by running the position data with the moving mirror projection assembly in a particular projection set up or environment. This allows a user or operator to perform fine tuning of the motion distortions/corrections to suit the particular requirements of any given projection geometry and other limitations.

Without additional corrections of the media that is projected or provided to the projector, there may be image distortion (e.g., keystone, rotation, and scale distortion of the image or the like), and some embodiments of the invention provide correction for such image keystone, rotation, and scale distortion as a preprocessing step. In use of the projector assembly to display a character across a larger display surface with a single projector, the moving mirrors move (or the projected character moves) farther from the center of the projection surface, and vertical and/or horizontal keystone distortion may be introduced into the image. Due to the varying installation parameters of each projector, folding mirrors (or no folding mirrors), and display surface/screen, each projection system may experience unique or differing distortion. The distortion may be corrected in some embodiments by driving the projector live from a laptop or other computer/ controller device, then manually changing the position of the mirrors to the extents of the character motion. For each position, an opposite distortion may be created by introducing a keystone distortion that cancels out the true or expected distortion, which results in a rectilinear and scaled output image for the projection assemblies of at least some embodiments of the present invention. For example, input position numbers (from the source media) may be processed through this "distortion field." Then, a correct "pre-distortion" may be applied to the source media to create a "pre-distorted" media that may be input to or played by the projector so that when the scene is played the character (e.g., an animated fish or the like) remains the same or correct size and shows no (or substantially no) keystone distortion regardless of where the character travels across the display or projection surface (e.g., even when at a large angle relative to perpendicular from the mirror assembly outlet).

Video black near a character may be hard to avoid in the area between a character and the edge of the moving projection area/field provided by moving mirror assemblies. As described with reference to FIG. 5-7, an aperture may be included in the mirror housing such as at the point in the beam from the projector where the aperture/stop can be used to soften the edge of the video (and shape the output projection area/field). The aperture may be used to hide the hard edge of the video frame and blend the complete black provided by the projection assembly about the periphery of the projection field and the bright character in the center. The resulting "glow" around the character may be desirable in some applications such as to mimic diffuse underwater lighting effects (e.g., that may be used in underwater filming or computer graphic-based media sources).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The term "mirror" as used in this description is intended to describe conventional mirrors and mirrored surfaces but also other reflectors and reflective surfaces and materials useful for reflecting or redirecting light, and the mirrors shown are generally planar but other cross-sectional shapes may be used such as concave, convex, parabolic, and other mirror configurations.

Also, a one-projector assembly display or projection system was discussed in detail with a second embodiment shown with two projectors to provide two characters that may interact. The number of projectors is not limiting to the invention with some embodiments including a plurality of projectors such as one per character/object to be displayed on a corresponding display surface(s). In other embodiments, two or more projection assemblies are used to display the same or differing characters/objects along a long or large projection surface with each assembly projecting on a subset of the projection surface (which may be made up of a number of separate FP or RP screens or other surfaces) such as for providing displayed images along an amusement or theme park ride.

Additionally, the input imagery or streams provided to the projectors may be pre-recorded or computer-generated in real time as may be the animation or projection patterns/paths used to define the X-Y coordinates of the centers of projection areas/fields. In some applications, the size or amount of travel of the character as provided by the moving mirrors may be adjusted in the field with software or other tools such that the travel pattern fits a particular projection surface/screen. Preferably this field adjustment of the amount of travel can be done without having to modify the input media or distorting the output characters. For example, field adjustments/control can be used to align projected characters with fixed objects (e.g., a mechanically animated character that the projected character or object interacts with such as landing on it, brushing or contacting it, or the like) while avoiding edges of projection screens, folding mirrors, and/or structural supports.

In some embodiments, the projection or animation pattern (e.g., X and Y coordinates or positions) may not be predefined (stored in memory). Instead, it may be useful for the projected character to follow a path or pattern defined all or in part based on real time data. For example, real time tracking may be performed to determine a location of a projection area displaying an animated character/object (e.g., a position sensor placed on or held by a live actor or the like), and positioning of the sharp/bright media of the moving mirror projector assembly in a live show or in an interactive video or similar game. In some embodiments, the brightness of the projected character may be used in higher light applications/environments such as ambient light or outdoor projection surfaces. For example, concentrated small characters or objects may be projected in a bright, ambient light environment such as the side of a building or on the ground in a pedestrian area.

In another embodiment of a projection system, a moving mirror projector assembly is used to provide characters that are able to move off of a movie or similar large fully projected screen onto other surfaces within the theater. For example, a character in a movie may move off of the main screen to a side wall, the floor, or the ceiling (or any other projection/display surface) through the use of a moving mirror projector assembly and a properly designed projection/animation path or pattern provided to the mirror motor controller(s). This may be achieved by providing an XY projection assembly to serve each adjoining service (e.g., an assembly for the ceiling next to a conventional projector screen, another assembly for a sidewall, and so on). In other cases, it may be desirable to provide a 3D effect or Z-axis effect such as when multiple projection surfaces at differing distances from the projection assembly outlet are utilized. A Z-axis effect may be achieved in embodiments of the invention by incorporating a motorized zoom lens or similar device and/or a motorized iris as the aperture.

While the projection areas described herein are typically a single or fixed size and shape, there may be applications or embodiments where it is useful to increase or decrease the size of the projection area (or alter its shape such as to suit differing characters or achieve a particular effect). For example, a character may move further away from the audience or closer to the audience within the projection area (e.g., grow smaller or larger within the media fed to the projector). In such cases, it may be desirable to allow the projection area to vary in size such as to avoid situations where there is too much "gray" area about the character when it is smaller than the projection area and where the character completely fills or exceeds the projection area. In such cases, the block or aperture may of the assembly may be configured to have a variable size (and/or shape) that is controllable based on triggers in the projector input media or other devices (such as by a projector controller processor and/or ride or assembly control module or the like). A character's pose might dictate a dynamic change in aperture, as in a fish viewed from head on versus a fish in profile or the change in size as a fish swims away or toward a viewer.

We claim:

1. A moving mirror projection method, comprising:
   positioning a moving mirror projection assembly proximate to a projection surface, the moving mirror projection assembly comprising a projector, an X-axis mirror and a Y-axis mirror each being rotatable about an axis and positioned to receive output light from the projector, and comprising a pair of drive motors for selectively rotating the mirrors;
   operating the projector to project a stream of images including an animated object, wherein the projected stream of images is reflected from both of the mirrors and onto a projection area on the projection surface;
   concurrently with the projector operating, controlling the drive motors to move the projection area to a plurality of X-Y coordinates defining an animation pattern for the animated object, whereby the animated object is animated within the projection area and is moved along with the projection area about the projection surface;
   positioning a second moving mirror projection assembly proximate to the projection surface;
   operating a projector of the second moving mirror projection assembly to project a second stream of images including a second animated object on a second projection area on the projection surface; and
   controlling a second pair of drive motors to move a second pair of X-axis and Y-axis mirrors to move the second projection area to a plurality of X-Y coordinates defining a second animation pattern, whereby the animated object and the second animated object move independently from each other and interact on the projection surface based on the animation patterns.

2. The method of claim 1, further comprising processing a source media to obtain the stream of images and to determine a set of positions for the mirrors to provide the plurality of X-Y coordinates for the projection area based on a position of the animated object within the source media.

3. The method of claim 1, wherein the projection area has a size that is less than about one tenth of the projection surface and wherein substantially no light from the projector is projected on portions of the projection surface outside of the projection area.

4. The method of claim 1, further comprising positioning a mechanically animated element adjacent the projection surface, wherein the animation pattern is defined to cause the animated object to be positioned proximate to the mechanically animated element, and the method further comprising operating the mechanically animated element when the animated object is in the proximate position.

\* \* \* \* \*